UNITED STATES PATENT OFFICE.

HERBERT H. DOW, OF MIDLAND, MICHIGAN, AND WALTER S. GATES, OF WORTHINGTON, ONTARIO, CANADA, ASSIGNORS TO THE ONTARIO NICKEL COMPANY, LIMITED, OF WORTHINGTON, CANADA, A CORPORATION.

PROCESS OF SEPARATING METALS IN SOLUTION.

No. 913,709.      Specification of Letters Patent.      Patented March 2, 1909.

Application filed April 27, 1907. Serial No. 370,741.

*To all whom it may concern:*

Be it known that we, HERBERT H. DOW and WALTER S. GATES, both citizens of the United States, residents of Midland, county of Midland, and State of Michigan, and Worthington, district of Algoma, and Province of Ontario, Canada, respectively, have invented a new and useful Improvement in Processes of Separating Metals in Solution, of which the following is a specification, the principle of the invention being herein explained and the best mode in which we have contemplated applying that principle, so as to distinguish it from other inventions.

Our invention relates to processes of separating metals and especially to a separation of the same, each substantially free of all the others, when contained in a water solution.

Said invention consists of steps hereinafter fully described and specifically set forth in the claims.

The improved results obtained by our new process are effected by reason of the fact which we have discovered that, when a reagent which is capable of precipitating at least one of the metals as an insoluble compound is added to a solution of metals—more or less of the insoluble compounds of the other metals are simultaneously precipitated, depending upon the circumstances of each particular case—if the degrees of insolubility of the insoluble compounds thus precipitated are different and vary among themselves within reasonable limits, and there be present in the original solution enough of the metal, which upon the addition of the reagent forms the more insoluble compound, to be at least a chemical equivalent of the reagent, then, the more insoluble precipitate is purified of its inclusions of the slightly less insoluble precipitates of the other metals by subjecting the original solution and precipitates to a prolonged agitation by means of which the soluble compound of the metal forming the more insoluble precipitate reacts with the precipitates of the other metals to form soluble compounds of said other metals and more of the insoluble precipitate which is being purified.

We find a particular application for our improved process in the separating of iron, copper and nickel from each other, each in the form of a precipitate substantially free of the others, when all are contained in the same original water solution.

We are aware that iron, copper and nickel have been taken from a water solution in the same order and by the same reagents that we use, but we are not aware that products anywhere nearly pure have been obtained in the manner embodying our improved process. However, in fact we do know that large amounts of the valuable metals have been lost in the iron precipitate in other processes.

The fact is well-known that, if two metals are present in a solution, and one of the metals forms a precipitate or an insoluble compound more insoluble than the corresponding compound of the second metal, and there is added to the solution the proper amount of a reagent capable of throwing down the first metal as a precipitate, then, said precipitate will in many cases carry down with it in insoluble form part of the second metal. This will happen, first, always in case the second metal is also capable of being precipitated by the reagent which is used, and secondly, often even if said second metal is not capable of being so precipitated.

As an example of the first case, if a solution of iron and nickel is treated with calcium hydrate, which reagent will precipitate either metal alone, and the reagent is added in the proper amount to precipitate the iron, the iron precipitate will always carry down some insoluble nickel. As an example of the second case, if a solution of iron and nickel, with ammonium chlorid present, be treated with ammonium hydrate, which reagent will precipitate iron alone with ammonium chlorid, but which will not precipitate nickel alone with ammonium chlorid, and the reagent be added in the proper amount to precipitate the iron, the iron precipitate will always carry down some insoluble nickel. In both of these cases, if the nickel were not present in the original solution in an amount much greater than the iron, the iron will predominate in the precipitate because ferric hydrate is more insoluble than nickel hydrate. The usual way in which these precipitations would be made in the laboratory would be to add to the solution of iron and nickel in a beaker the proper amount of reagent and agitate by means of a stirring rod until the mixture became homogeneous and then stop, the idea being that the precipitation of a certain amount of nickel in the iron was unavoidable and irremediable except, of course, by the use of some solvent (such as ammonium hydrate) which will dissolve nickel precipitates but will not dissolve iron precipitates.

We are not aware that it has been known that a slow subsequent action is possible by agitating the mixture in the presence of an excess of soluble salt of the metal forming the more insoluble precipitate, in this case iron. It has always been considered impossible to get the iron out free of copper and nickel and in fact has been considered necessary to take out the iron by means of a weak alkali (followed by a strong alkali for the nickel) or else the iron precipitate would contain a very large amount of nickel.

By our improved method the iron may be precipitated by as strong an alkali as is used for the nickel, in fact all three metals, iron, copper and nickel, may be removed by the same reagent which may be strong or weak. The old method of purifying such a precipitate of the included metal, such, for instance, as the purifying of ferric hydrate of inclusion of nickel hydrate, is to separate the precipitate from the solution, dissolve it, for instance in an acid, and then reprecipitate with a proper amount of a suitable reagent, whereby all the iron is again thrown down and containing some nickel, but not so much of the latter as before, the difference of nickel being left in the second filtrate. The reason why the nickel exists in the second filtrate in less quantities than it does in the first is because in the acid solution it is in a more disseminated condition with regard to the iron than it was in the original solution, there being less nickel present, and only part of the nickel present being thrown down each time. Therefore a sufficient number of separations in sufficiently dilute solutions will accomplish a quantitative separation, giving all the nickel in the united filtrate which will be very dilute. This method is commonly used in quantitative analysis, and ordinarily four separations under good conditions are sufficient. Our method, however, as ordinarily practiced, while giving the precipitate practically pure, does not at one time remove from the solution all of the metal forming the most insoluble precipitate, because of the fact that the precipitate is afterwards purified by agitation in a solution containing an excess of a soluble salt of the metal which is being purified. Our method is, therefore, not applicable to quantitative analysis, but is applicable to the commercial separation of metals from a solution which is being supplied continuously to the cycle.

The following description sets forth in detail certain modes of carrying out the invention, such disclosed modes constituting but a part of the various ways in which the principle of the invention may be used.

The apparatus required to carry out our improved process consists of any suitable form of agitating and containing tanks, and filtering or settling devices, and is the same for the separation of iron, copper and nickel as it is for other metals and substances.

We have devised several methods for carrying out our invention, each of which depends for its improved result of obtaining substantially pure precipitates upon the comparative solubilities of the substantially insoluble precipitates which are thrown down from the original solution when a reagent is added thereto in an amount equal to the chemical equivalent of the metal which forms the more insoluble precipitate. Such invention is thus broadly set forth in our pending application Serial No. 300,728, filed February 12, 1906, where three of the several methods to which allusion is here made are described in detail. This our present application relates specifically to one of these methods only. This method of accomplishing the separation of iron copper and nickel consists in adding to a portion of the original solution of the three metals named, less than the chemical equivalent of reagent capable of precipitating the iron as, for instance, powdered limestone. The result of such addition is the almost immediate precipitation from the solution of the major portion of the iron as an hydrate, but along with it, even in dilute solution, there is some copper and nickel thrown down as basic carbonates. A prolonged agitation of the precipitates in the original solution purifies the iron precipitate of the included copper and nickel basic carbonates because of the comparative insolubilities of the ferric hydrate and said basic carbonates, according to the following order of insolubility:—

Most insoluble $FeO_3H_3$,
Less insoluble $CuCO_3$ $CuO_2H_2$ and $CuO_2H_2$,
Least insoluble $NiCO_3$ $NiO_2H_2$ and $NiO_2H_2$.

The excess of iron salt in solution thus slowly dissolves, under the effect of vigorous agitation, the copper and nickel basic carbonates contained in the insoluble ferric hydrate, and precipitates in turn more ferric hydrate. For instance, suppose the original solution consists of the chlorids of iron, copper and nickel, then the following reactions take place:—

$2FeCl_3 + 3CaCO_3 + 3H_2O + CuCl_2 + NiCl_2 = 2FeO_3H_3 + 3CaCl_2 + 3CO_2 + $ a little $CuCO_3$. $CuO_2H_2 + $ a little $NiCO_3NiO_2H_2 + NiCl_2 + CuCl_2 + $ a little $FeCl_3$.
$3CuCO_3CuO_2H_2 + 4FeCl_3 + 3H_2O$ agitated $= 6CuCl_2 + 3CO_2 + 4FeO_3H_3$.
$3NiCO_3 + NiO_2H_2 + 4FeCl_3 + 3H_2O$ agitated $= 6NiCl_2 + 3CO_2 + 4FeO_3H_3$.

After a prolonged agitation of the mixture of solution and precipitate, the ferric hydrate is found to be substantially free of the included copper and nickel basic carbonates. Such purified iron precipitate is then separated out from the solution which will contain in addition to all the copper and nickel, the portion of iron originally present in excess of the reagent added. To this solution, containing thus a small amount of iron only, is added an additional quantity of the reagent in amount slightly in excess of that which is required as a chemical equivalent of such remaining iron, which latter is thereupon precipitated as an impure precipitate containing copper and nickel substantially in accordance with the equations last above given. Upon removing such mixed precipitate, the solution is obviously left free of all iron. This mixed precipitate is put with a quantity of precipitate which is being purified in the manner just described, whereby the iron content of the precipitate is purified of its inclusions of copper and nickel precipitate, by a prolonged agitation in the original solution, which contains of course an excess of soluble iron salt.

The solution of copper and nickel from which the iron has been thus removed is then agitated with calcium hydrate added to less than the chemical equivalent of the copper present, the result being the almost immediate precipitation of the major portion of the copper as hydrate, which latter however will also contain some nickel hydrate. A prolonged agitation of this impure copper precipitate in the copper and nickel solution will purify said precipitate of the nickel because of the comparative solubilities of the hydrates of the two metals. The excess of the soluble copper salt in the original solution thus slowly dissolves the nickel hydrate contained in the insoluble cupric hydrate and precipitates in turn more cupric hydrate, the reactions being as follows:

$CuCl_2 + NiCl_2 + CaO_2H_2 = CuO_2H_2 + CaCl_2 + NiCl_2 +$ a little $CuCl_2 +$ a little $NiO_2H_2$.
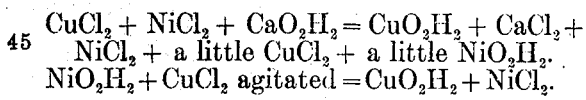
$NiO_2H_2 + CuCl_2$ agitated $= CuO_2H_2 + NiCl_2$.

After a prolonged agitation of the mixture the cupric hydrate is found to be substantially free of the nickel hydrate. Such purified copper precipitate is then separated out from the solution which will contain in addition to all the nickel, the portion of copper originally present in excess of the calcium hydrate added. To this solution, containing the small amount of copper remaining, is added an additional quantity of the reagent in amount slightly in excess of that which is required as a chemical equivalent of such remaining copper. The latter is thereupon precipitated as an impure precipitate, more or less nickel being included, and is thereupon removed to be further treated as had been the mixed iron precipitate in the preceding stage of the process. A pure solution of nickel obviously will remain, from which upon the addition of a suitable reagent such as the aforementioned calcium hydrate, all the nickel will be precipitated, free from the iron and copper, the reaction being:—

$NiCl_2 + CaO_2H_2 = NiO_2H_2 + Ca Cl_2$
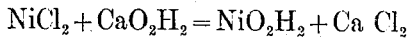

No prolonged agitation is, of course, necessary in connection with this last precipitation. The above method amounts in effect, to the addition of the reagent in an amount just the chemical equivalent of the metal to be precipitated, since for example in the case of the copper and nickel present as impurities in the iron precipitate such metals act as a reagent during the purifying agitation to produce more of the soluble copper and nickel compounds.

Of course it will be remembered that the separation takes place as well with the salts of the other mineral acids and mixtures as it does with the chlorid solutions.

It is contemplated in the above description that the method of treatment herein described, is applicable not alone to the separation of iron from nickel and copper, but also to thus separating aluminum and combinations of these two metals, as also iron in both conditions of oxidation.

We mean to include in the term "nickel" the nickel group of similar metals, viz. nickel and cobalt alone and together.

We mean by the term "prolonged agitation" agitation for a length of time greater than that ordinarily required by a chemical reagent to act on a solution which is capable of being precipitated by it, and make the resulting mixture homogeneous.

We mean by the term "chemical equivalent of a reagent" such an amount of that reagent as actually and finally enters into the reaction, since the cores of some particles of insoluble reagent might not react and it would be necessary, therefore, to add the reagent in a quantity in excess of that representing the theoretical chemical equivalent.

We mean by the term "insoluble precipitates" those that are more insoluble than the hydrates of barium and calcium, for instance, the hydrates and carbonates of iron, aluminum, copper, nickel, etc.

It is a well-known law, of course, that the insoluble compounds tend to form and precipitate; for instance, the following reaction naturally takes place immediately.

$CaO_2H_2 + MgCl_2 = MgO_2H_2 + CaCl_2$
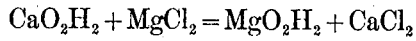

However, our improved process cannot be classified as coming solely under this broad head, but rather is a simultaneous dissolving to the very slight amount possible, of the more soluble component of a substantially insoluble mixture, and a precipitation from the solution of the other metal which is contained also as the more insoluble compound in the original insoluble mixture.

There are several reagents any one of which might be used in certain steps of our process. Instead of calcium carbonate in the precipitation of the iron, other alkaline earth carbonates and hydrates may be substituted, such as calcium hydrate and sodium hydrate. For the calcium hydrate in the copper precipitation there might be substituted such alkaline or alkaline earth carbonates and hydrates as calcium carbonate, sodium hydrate and sodium carbonate. If any one of the three metals, iron, copper and nickel, is absent, the other two may be separated and purified as described above, simply omitting the steps required by our process for that particular metal which is absent. For instance, iron could be separated from nickel alone; from copper alone; or copper could be separated from nickel alone.

It sometimes happens that a change of temperature from the ordinary is an aid to the separation by causing an appreciable difference in the slight solubilities of the two insoluble substances, which have, at ordinary temperatures, solubilities so nearly identical that an econoimc separation is prevented. For instance, compounds of cobalt and nickel might have substantially the same solubilities at a temperature of 20 degrees; whereas at 60 degrees their solubilities might be so different as to allow of an economic separation by our process. If, at any time, more of the reagent is added than the chemical equivalent of the metal to be precipitated, the condition of equilibrium can be restored by the addition of more of the original solution, which amounts, in effect, to the adding of the chemical equivalent.

Our method does not give dilute solutions and yet we obtain pure precipitates of the iron, copper and nickel, instead of the impure precipitates which are obtained by present methods, and the basic principle of our process is the purification of any precipitated metal or substance of the inclusions of other precipitated metals or substances slightly more soluble than the first, all of the precipitates being substantially insoluble—although nothing is absolutely insoluble in a solvent—by means of agitating such impure precipitate in a solution containing soluble salts of the more insoluble metal. We do not confine ourselves to the use of water as a solvent for obtaining the original solution. Where both or all of the metals in solution are capable of being precipitated by the reagent used, there has often been left and lost as much as 25% impurity, for instance, of nickel in the iron; whereas, we are able, by our method, to free the iron precipitate entirely of the nickel impurity by a sufficiently long and vigorous agitation. Such an impure iron precipitate may, for instance, be purified with vigorous agitation in one to four hours depending on conditions to a point where only 1% nickel remains. Our method, of course, works best on substances which, although insoluble, are colloidal and freely disseminated, since, thus, infinitely great surfaces are constantly presented for solution and subsequent immediate action of the soluble salt.

We wish to point out that, if the addition of the required amount of reagent be made so gradually that it extends over a considerable length of time during which agitation is going on, this amounts in substance to "adding the required amount of reagent and then subjecting the mixture to prolonged agitation." Finally, we should state that by the expression "the metal which is being purified" we mean the metal which we are trying at any particular stage in the process to remove as a precipitate free of the other metal or metals.

Other modes of applying the principle of our invention may be employed instead of the one explained, change being made as regards the process herein disclosed, provided the step or steps stated by any one of the following claims or the equivalents of such stated step or steps be employed.

We therefore particularly point out and distinctly claim as our invention:—

1. In a process of separating one metal substantially free from another, such metals being contained in a solution, the steps which consist in adding to the solution a reagent capable of producing a relatively insoluble precipitate with one of the metals, such reagent being added in an amount less than the chemical equivalent of said one metal; and then agitating the resultant mixture until any included precipitates of the other metals are dissolved out.

2. In a process of separating one metal substantially free from another, such metals being contained in a solution, the steps which consist in adding to the solution a reagent capable of producing substantially insoluble precipitates with said metals, one precipitate, however, varying from the other in its degree of solubility, such reagent being added in an amount less than the chemical equivalent of one of said metals; and then agitating the resultant mixture until any inclusions of the more soluble precipitates are substantially dissolved out.

3. In a process of separating metals in solution, the steps which consist in adding to the solution a reagent capable of forming substantially insoluble precipitates with said metals, one precipitate, however, being slightly less soluble than the others, such reagent being added in an amount less than the chemical equivalent of such less soluble precipitate; and then agitating the mixture resulting upon the addition of such reagent ntil any inclusions of the other precipitates are dissolved out of such less soluble precipitate.

4. In a process of separating metals in solution, the steps which consist in adding to the solution a reagent capable of forming substantially insoluble precipitates with said metals, one precipitate, however, being slightly less soluble than the others, such reagent being added in an amount less than the chemical equivalent of the metal producing such less soluble precipitate; agitating the mixture resulting upon the addition of such re-agent until such less soluble precipitate is purified of the inclusions of the other precipitates; removing such purified precipitate; adding to the remaining solution an amount of such reagent sufficient to actually precipitate the balance of such metal; and repeating the foregoing series of steps with the then remaining solution until all the metals are separated.

5. In a process of separating metals in solution, the steps which consist in adding to the solution a reagent capable of forming substantially insoluble precipitates with said metals, one precipitate, however, being slightly less soluble than the others, such reagent being added in an amount less than the chemical equivalent of the metal producing such less soluble precipitate; agitating the mixture resulting upon the addition of such re-agent until such less soluble precipitate is purified of the inclusions of the other precipitate; removing such purified precipitate; adding to the remaining solution a quantity of such reagent slightly in excess of that required as a chemical equivalent of such metal remaining unprecipitated; and repeating the foregoing series of steps with the then remaining solution until all the metals are separated.

6. In a process of separating metals in solution, the steps which consist in adding to the solution a reagent capable of producing a relatively insoluble precipitate with one of the metals, such reagent being added in an amount less than the chemical equivalent of said one metal; agitating the resultant mixture until the precipitate of said metal is purified of the inclusions of the other metals; adding to the remaining solution an amount of such reagent sufficient to actually precipitate the balance of such first metal; adding the resultant impure precipitate to another quantity of the first precipitate being purified in the manner just mentioned.

7. In a process of separating metals in solution, the steps which consist in adding to the solution a reagent capable of producing a relatively insoluble precipitate with one of the metals, such reagent being added in an amount less than the chemical equivalent of said one metal; agitating the resultant mixture until the precipitate of said metal is purified of the inclusions of the other metals; adding to the remaining solution an amount of such reagent sufficient to actually precipitate the balance of such first metal; adding the resultant impure precipitate to another quantity of the first precipitate being purified in the manner just mentioned; and repeating the foregoing series of steps with the then remaining solution until all the metals are separated.

8. In a process of separating metals in solution, the steps which consist in adding to the solution a reagent capable of producing a relatively insoluble precipitate with one of the metals, such reagent being added in an amount less than the chemical equivalent of said one metal; agitating the resultant mixture until the precipitate of said metal is purified from inclusions of the other metals; adding to the remaining solution a quantity of such reagent slightly in excess of that required as a chemical equivalent of such first metal; and adding the resultant impure precipitate to another quantity of the first precipitate being purified in the manner just described.

9. In a process of separating metals in solution, the steps which consist in adding to the solution a reagent capable of producing a relatively insoluble precipitate with one of the metals, such reagent being added in an amount less than the chemical equivalent of said one metal; agitating the resultant mixture until the precipitate of said metal is purified from inclusions of the other metals; adding to the remaining solution a quantity of such reagent slightly in excess of that required as a chemical equivalent of such first metal; adding the resultant impure precipitate to another quantity of the first precipitate being purified in the manner just mentioned; and repeating the foregoing series of steps with the then remaining solution until all the metals are separated.

10. In a process of separating iron and nickel in solution, the steps which consist in adding to the solution a reagent capable of producing an insoluble precipitate with the iron, such reagent being added in an amount less than the chemical equivalent of the iron; and then agitating the mixed solution and precipitate until any inclusions of nickel precipitate are substantially dissolved out.

11. In a process of separating iron and nickel in solution, the steps which consist in adding to the solution a reagent capable of producing an insoluble precipitate with the iron, such reagent being added in an amount less than the chemical equivalent of the iron; agitating the resultant mixture until the iron precipitate is purified of any inclusions of nickel; removing such purified precipitate; adding to the remaining solution an amount of such reagent sufficient to actually precipitate the balance of the iron; and adding the resultant impure precipitate to another quantity of the first precipitate being purified in the manner just mentioned.

12. In a process of separating iron, copper, and nickel in solution, the steps which consist in adding to the solution a reagent capable of producing a relatively insoluble precipitate with the iron, such reagent being added in an amount less than the chemical equivalent of the iron; agitating the resultant mixture until the iron precipitate is purified of any inclusions of copper and nickel; adding to the remaining solution an amount of such reagent sufficient to actually precipitate the balance of the iron; adding the resultant impure precipitate to another quantity of the first precipitate being purified in the manner just mentioned; and repeating the foregoing series of steps with the then remaining solution to similarly remove the copper and leave a pure solution of nickel.

13. In a process of separating iron and nickel in solution, the steps which consist in adding to the solution powdered limestone in an amount less than the chemical equivalent of the iron, whereby the major portion of the latter is precipitated as ferric hydrate; agitating the resultant mixture until the iron precipitate is purified of any inclusions of nickel; removing such purified precipitate; adding to the remaining solution an amount of the limestone sufficient to actually precipitate the balance of the iron whereby a pure solution of nickel is left; and adding the resultant impure precipitate to another quantity of the first precipitate being purified in the manner just described.

14. In a process of separating iron, copper, and nickel in solution, the steps which consist in adding to the solution powdered limestone in an amount less than the chemical equivalent of the iron, whereby the major portion of the latter is precipitated as ferric hydrate; agitating the resultant mixture until the iron precipitate is purified of any inclusions of nickel; removing such purified precipitate; adding to the remaining solution an amount of the limestone sufficient to actually precipitate the balance of the iron, whereby a pure solution of copper and nickel is left; adding the impure precipitate to another quantity of the first precipitate being purified in the manner just described; treating the solution of copper and nickel with calcium hydrate in an amount less than the chemical equivalent of the copper therein; and then purifying the resultant precipitate and solution in the same manner as before.

Signed by HERBERT H. DOW, this 10th day of April, 1907.

HERBERT H. DOW

Attested by—
  D. T. DAVIES,
  JNO. F. OBERLIN.

Signed by WALTER S. GATES, this 2 day of April, 1907.

WALTER S. GATES.

Attested by—
  A. N. PATRIARCKE,
  C. J. STROSACKER.